United States Patent
Crissy

(10) Patent No.: US 7,197,959 B2
(45) Date of Patent: *Apr. 3, 2007

(54) COUPLING STRUCTURE MOUNTABLE TO A ROTATABLE SHAFT

(75) Inventor: Michael Crissy, Hanover, MI (US)

(73) Assignee: EaglePicher Incorporated, Phoenix, AZ (US)

( * ) Notice: Subject to any disclaimer, the term of this patent is extended or adjusted under 35 U.S.C. 154(b) by 486 days.

This patent is subject to a terminal disclaimer.

(21) Appl. No.: 10/657,954

(22) Filed: Sep. 9, 2003

(65) Prior Publication Data

US 2005/0050985 A1  Mar. 10, 2005

(51) Int. Cl.
*F16F 15/12* (2006.01)
*F16D 3/00* (2006.01)

(52) U.S. Cl. .................. 74/574.4; 74/572.2; 464/90

(58) Field of Classification Search ............... 464/90; 29/278; 474/237, 161; 403/228; 74/446, 74/572.2, 573.12, 574.4
See application file for complete search history.

(56) References Cited

U.S. PATENT DOCUMENTS

| | | | |
|---|---|---|---|
| 3,196,710 A | 7/1965 | Peirce | 74/574 |
| 3,200,665 A * | 8/1965 | Wells | 74/446 |
| 3,222,953 A | 12/1965 | Benjamen | 74/574 |
| 3,440,899 A | 4/1969 | McGavern et al. | 74/574 |
| 3,495,459 A | 2/1970 | McLean | 74/574 |
| 3,651,705 A * | 3/1972 | Bertinetti et al. | 474/161 |
| 4,178,811 A | 12/1979 | Shepherd | 74/574 |
| 4,302,986 A | 12/1981 | Shepherd | 74/574 |
| 4,440,451 A * | 4/1984 | Goodell et al. | 301/105.1 |
| 4,468,210 A | 8/1984 | McCutchan, Jr. | 474/170 |
| 4,473,363 A | 9/1984 | McCutchan, Jr. | 474/161 |
| 4,603,997 A * | 8/1986 | Hundt et al. | 403/228 |
| 4,717,370 A | 1/1988 | Rohrig | 474/161 |
| 4,722,722 A * | 2/1988 | Rampe | 474/161 |
| 4,899,323 A | 2/1990 | Fukahori et al. | 367/176 |
| 4,946,427 A | 8/1990 | Rampe | 474/161 |
| 5,024,120 A | 6/1991 | Andra | 74/574 |
| 5,112,282 A | 5/1992 | Patterson | 474/260 |
| 5,377,962 A | 1/1995 | Ochs et al. | 267/281 |
| 5,449,322 A | 9/1995 | Wagner | 464/90 |
| 5,452,622 A | 9/1995 | Fenelon | 74/411 |
| 5,460,356 A | 10/1995 | Schwibinger | 267/281 |
| 6,167,782 B1 * | 1/2001 | Chevalier | 474/237 |
| 6,216,327 B1 * | 4/2001 | Hendrian | 29/278 |
| 6,293,871 B1 | 9/2001 | Geislinger | 464/77 |
| 6,875,113 B2 * | 4/2005 | Nichols | 464/90 |
| 2003/0060289 A1 | 3/2003 | Nichols | 464/89 |

FOREIGN PATENT DOCUMENTS

DE  2550 560 A1 *  5/1977

* cited by examiner

*Primary Examiner*—Vinh T. Luong
(74) *Attorney, Agent, or Firm*—Wood, Herron & Evans, L.L.P.

(57) ABSTRACT

A coupling structure capable of being removed in an undamaged condition from a rotatable shaft. The coupling structure includes a metallic insert and a polymer hub surrounding the metallic insert. The metallic insert features a sleeve and a flange at the leading edge of the sleeve remote from the opening into which the shaft is inserted. Forces applied to the flange are preferentially transferred to the metallic insert such that the polymer hub remains substantially stress-free. The coupling structure may be incorporates into a torsional vibration damper that further includes an inertia member encircling the polymer hub and an elastomer layer situated between the inertia member and the polymer hub. The coupling structure permits the torsional vibration damper to be removed undamaged from a crankshaft.

16 Claims, 2 Drawing Sheets

COUPLING STRUCTURE MOUNTABLE TO A ROTATABLE SHAFT

FIELD OF THE INVENTION

The invention relates to coupling structures for rotatable shafts and, in particular, to a coupling structure for a torsional vibration damper adapted to be mounted to a rotatable shaft of an internal combustion engine.

BACKGROUND OF THE INVENTION

Coupling structures are commonly used for coupling a rotatable shaft to provide a driving arrangement with a driven structure. Internal combustion engines rely on coupling structures known as torsional vibration dampers to lessen the vibrations in rotatable shafts, such as the crankshaft, caused by intermittent applications of either power or load that are not smooth and continuous. Unless controlled, the vibrations may lead to shaft failure and may contribute to causing other parts of the engine or cooling system, particularly where resonance occurs, to fail. One familiar variety of conventional torsional vibration dampers include a metallic insert, a polymer hub surrounding the metallic insert, an inertia member radially outward of the polymer hub, and an annular elastomer layer disposed radially between the polymer hub and the inertia member.

Virtually all motor vehicles equipped with an internal combustion engine incorporates a serpentine drive belt system consisting of at least one endless drive belt and a series of pulleys. The pulleys derive power from the endless drive belt and operate to drive the vehicle accessory devices, such as the engine fan, power steering pump, air pumps, air conditioning unit, and the alternator. The endless drive belt that drives each of these pulleys is driven by a drive pulley connected to the crankshaft of the internal combustion engine. To reduce the transfer of vibrations between the crankshaft and the serpentine drive belt system, the drive pulley may comprise a torsional vibration damper that functions to reduces the amplitude or magnitude of the angular vibrations delivered by the crankshaft to the belt.

Conventional torsional vibration dampers are susceptible to irreversible structural damage when a gear puller is used to remove the torsional vibrational damper from the rotatable shaft to service the internal combustion engine or for use on a different engine. In use, the gear puller grasps the torsional vibration damper and applies a lateral force sufficient to disengage or pull it from the rotatable shaft. Due to the resistance provided by the press fit that captures the torsional vibration damper to the rotatable shaft, the lateral force that must be applied by the gear puller during removal is significant. The lateral force needed to remove the torsional vibration damper increases if the metallic hub is frozen to the rotatable shaft by corrosion, deformation, or the like. The large applied lateral forces may irreversibly damage the torsional vibration damper.

One observed failure mode is catastrophic mechanical damage to areas of polymer material contacted by the arms of the gear puller. Such mechanical damage can permanently unbalance the torsional vibration damper and thereby degrade its performance. In another common failure mode, the lateral force applied by the gear puller causes the metallic insert to separate from the polymer hub, such that the metallic insert remains attached to the rotatable shaft. In this instance, the torsional vibration damper is irreparably damaged.

There is a need, therefore, for a coupling structure capable of being removed from a rotatable shaft in an undamaged condition.

SUMMARY OF THE INVENTION

In accordance with the principles of the present invention, a coupling structure mountable to a rotatable shaft comprises a polymer hub having a plurality of service ports and a metallic insert disposed radially inward from the polymer hub. The metallic insert includes a tubular sleeve extending between a opposite first and second ends and an annular insert flange projecting radially outward from the second end. The first end is adapted for mounting to the rotatable shaft. The insert flange is accessible through the plurality of service ports for applying a force to the insert flange capable of removing the coupling structure from the rotatable shaft when mounted thereto.

In an alternative embodiment of the invention, the coupling structure may constitute a portion of a torsional vibration damper that is mountable to a crankshaft of an internal combustion engine. The torsional vibration damper includes an annular inertia member, an elastomer layer disposed radially inward from the inertia member, a polymer hub disposed radially inward from the elastomer layer, and an insert disposed radially inward from the polymer hub. The polymer hub has a plurality of axially-oriented service ports. The metallic insert includes a tubular sleeve having an open first end capable of being mounted to the rotatable shaft and a second end opposite the first end, and an annular insert flange projecting radially outward from the second end. The insert flange is accessible through the plurality of service ports for applying a force to the insert flange capable of removing the coupling structure from the rotatable shaft when mounted thereto.

The objects and advantages of the present invention will be further appreciated in light of the following detailed description and drawings in which:

DETAILED DESCRIPTION

Figure 1:
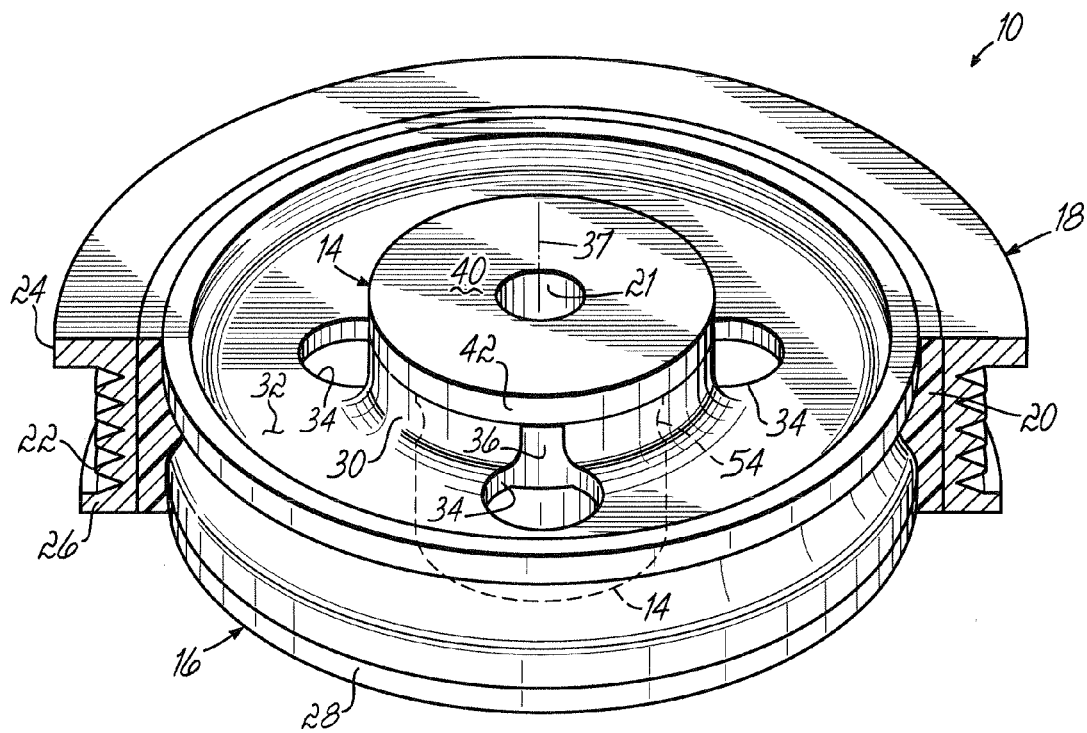
FIG. 1 is a perspective view partially in cross-section of a torsional vibration damper in accordance with the principles of the invention.
Figure 2:
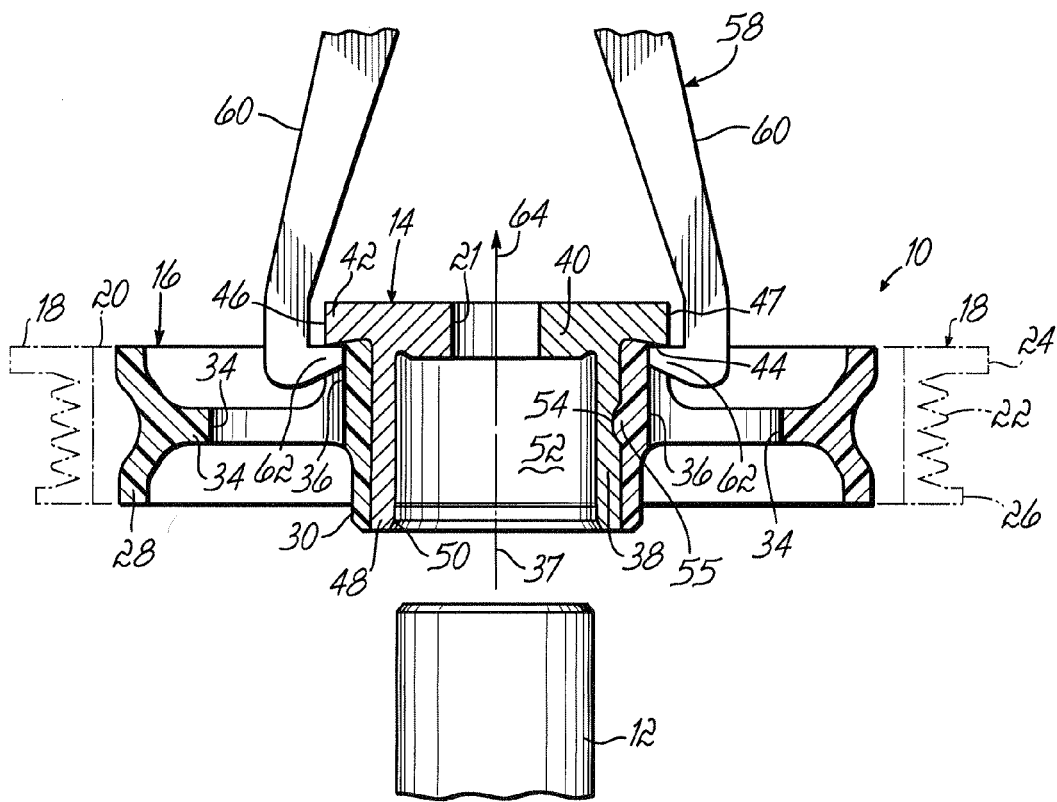
FIG. 2 is an axial cross-sectional view of the torsional vibration damper of FIG. 1 illustrating the removal of the torsional vibration damper from a rotatable shaft to which it is removably mounted when in use.
Figure 3:
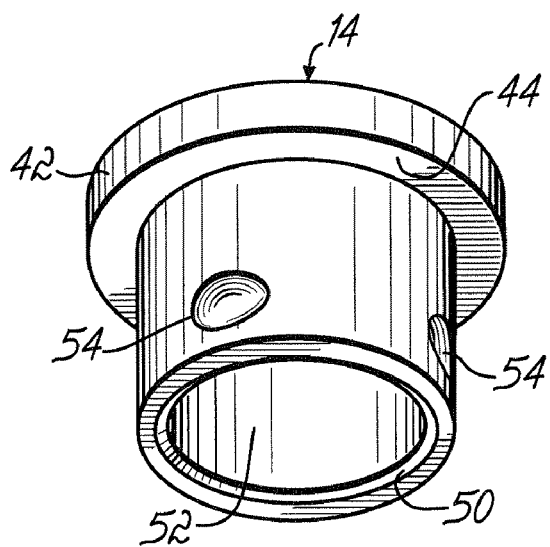
FIG. 3 is a perspective view of the metallic insert of the torsional vibration damper of FIG. 1 in which the polymer hub, elastomer ring and inertia member are omitted for clarity.

With reference to FIGS. 1–3, a torsional vibration damper, indicated generally by reference numeral 10, is shown mounted to one end of a rotatable shaft 12, such as the accessory end of a crankshaft opposite to the flywheel end, in an internal combustion engine. The torsional vibration damper 10 is assembled from a metallic insert 14, an annular polymer hub 16 disposed radially outward from the metallic insert 14, an inertia member 18 disposed radially outward from the polymer hub 16, and an annular elastomer layer 20 disposed radially in the space between the polymer hub 16 and the inertia member 18. The metallic insert 14 and the polymer hub 16, and typically the inertia member 18 and elastomer layer 20 as well, are arranged coaxially with a longitudinal axis 37 so that the structure is symmetrical about the longitudinal axis 37 and, as a result, balanced. The metallic insert 14 and annular polymer hub 16 collectively define a coupling structure for mounting the inertia member 18 and the elastomer layer 20 to the rotatable shaft 12. The torsional vibration damper 10 is mounted or anchored by a press fit to the shaft 12 so that the damper 10 and shaft 12 rotate at a common angular velocity.

The metallic insert 14 is formed by deforming and machining a plate of aluminum, aluminum alloy, or a steel, as 1018 cold rolled steel, or by casting or powder metallurgy techniques. The metallic insert 14 promotes the press fit between the torsional vibration damper 10 and the shaft 12. The polymer hub 16 is formed of any polymer that is mechanically stable at the operating temperatures found in the internal combustion engine environment of the shaft 12. For example, the polymer hub 16 may be formed from a glass-reinforced polyamide composite. The assembly constituted by the polymer hub 16 and the metallic insert 14 reduces the mass of the torsional vibration damper 10 by replacing the portions of a conventional all-metal construction with a lighter polymer-metal construction.

The polymer hub 16 is formed about the metallic insert 14 by a conventional method such as compression molding or injection molding in which the metallic insert 14 is centrally positioned within the mold cavity before the polymer is introduced. The ability to form the assembly of the polymer hub 16 and the metallic insert 14 by such methods provides a net-shape or near-net-shape product that requires little or no additional machining, which significantly reduces the manufacturing cost.

With continued reference to FIGS. 1–3, the inertia member 18 is formed of a metal, such as a steel, cast iron and aluminum, and is bonded by the elastomer layer 20 to the polymer hub 16. The elastomer layer 20 may be a preformed ring introduced into the open space between inertia member 18 and polymer hub 16 by hydraulic or pneumatic pressure or, alternatively, may be introduced into the open space in a liquid or flowable condition and cured. The elastomer constituting elastomer layer 20 is compounded to a specific formula and frequency that controls the natural response frequency of the torsional vibrations and forcing functions of the shaft 12 and the internal combustion engine. The choice of the geometry, size and mass of the inertia member 18 and the selection of the geometry, size, composition, and mass of the elastomer layer 20 for the torsional vibration damper 10 in order to reduce torsional vibrations is made in accordance with conventional techniques and standards. The invention is not limited to a specific geometrical configuration for the inertia member 18 and elastomer layer 20.

Extending circumferentially about the periphery of the inertia member 18 is at least one drive surface 22 capable of drivingly coupling with a belt (not shown) of a serpentine belt system for transferring power from the internal combustion engine to drive pulleys for accessories, including the engine fan, the power steering compressor, air pumps, the air conditioning compressor, and the alternator. The drive surface 22 may have other configurations as understood by persons of ordinary skill in the art. For example, drive surface 22 may be configured as a toothed sprocket or gear for engaging a drive chain or as a smooth, spade surface for engaging a flat belt surface. Guides 24 and 26 encircling the inertia member 18 restrict axial travel of the belt as the torsional vibration damper 10 is rotated by shaft 12. The torsional vibration damper 10 may also be used to transfer an axial clamp load that retains other timing gears and sprockets attached to the shaft 12, such as an oil pump gear, a drive sprocket for a cam chain, or a timing ring. The axial clamp load may be applied by a threaded crankshaft fastener (not shown) received in an opening 21 in metallic insert 14 and mated with a corresponding threaded opening (not shown) in shaft 12.

With continued reference to FIGS. 1–3, the polymer hub 16 includes an outer peripheral flange 28 interconnected with an inner peripheral flange 30 by a central radially-extending web or connecting wall 32 having opposed annular surfaces. A radially-outermost surface of the outer peripheral flange 28 is bonded to the elastomer layer 20. A radially-innermost surface of the inner peripheral flange 30 defines a cylindrical bore dimensioned and configured to receive the metallic insert 14. A plurality of service ports 34 perforate the connecting wall 32 at angularly spaced locations about connecting wall 32 and define bores having centerlines generally parallel to the longitudinal axis 37. In an exemplary embodiment, the connecting wall 32 is perforated by three service ports 34 having a symmetrical, centerline-to-centerline angular offset of about 120°. The service ports 34 facilitate removal of the torsional vibration damper 10 from the shaft 12, as discussed below. Each service port 34 is positioned radially relative to the longitudinal axis 37 of torsional vibration damper 10 such that a corresponding curved channel 36 is defined in the inner peripheral flange 30. Each channel 36 reduces locally the radial dimension of the inner peripheral flange 30.

The metallic insert 14 includes a tubular collar or sleeve 38 centered about the longitudinal axis 37, a radially-inward projecting portion or flange 40, and a radially-outward projecting portion or flange 42. Flange 42 overlaps radially with, or overhangs, the inner peripheral flange 30 of the composite polymer hub 16 such that, at the locations of each service port 34, flange 42 defines one of a plurality of lips 44 each of which is accessible through one of the service windows 34. Each lip 44 is free of the material forming the polymer hub 16, although the invention is not so limited as each lip 44 may be partially covered or may be covered by a limited polymer thickness. Flange 42 extends about the entire circumference of the sleeve 38.

With continued reference to FIGS. 1–3, each lip 44 presents an annular, inclined seating surface extending from a peripheral rim 47 of flange 42 to a curved intersection with the radially outermost surface of sleeve 38. In one embodiment of the invention, each lip 44 is beveled or angled at 80° relative to the longitudinal axis 37. Flange 30 has an outermost radial dimension substantially equal to the outermost radial dimension of each lip 44 so that each lip 44 overlies flange 30, other than in the vicinity of each service port 34. Material is removed from flange 30 in the area of each service port 34 to define channels 36 and, thereby, to expose each of the lips 44 for access through a corresponding one of the service ports 34.

Flange 42 is located axially at a leading end or edge 46 of metallic insert 14 opposite to a trailing end or edge 48 that defines a flared inlet 50 capable of guiding shaft 12 into a cup-shaped chamber 52 defined inside sleeve 38. The location of flange 42 is remote from the flared inlet 50 into which the shaft 12 is inserted so that an axially-outermost surface of flange 42 is exposed after the torsional vibration damper 10 is attached to shaft 12. The inner diameter of sleeve 38 is dimensioned relative to the outer diameter of shaft 12 for receiving shaft 12 in a press fit.

With reference to FIGS. 2 and 3, the sleeve 38 of the torsional vibration damper 10 includes torque-locking structure, in the form of one or more elongate grooves or concavities 54, extending radially into the sleeve 38 to define indentations. A major axis of each concavity 54 is oriented generally orthogonal to the longitudinal axis 37. Each concavity 54 is at least partially filled by a convex portion 55 of the material forming the polymer hub 16 so as to interlock the polymer hub 16 with the metallic insert 14. As a result, the polymer hub 16 resists rotation relative to the metallic insert 14 in either direction of rotation.

Figure 4:
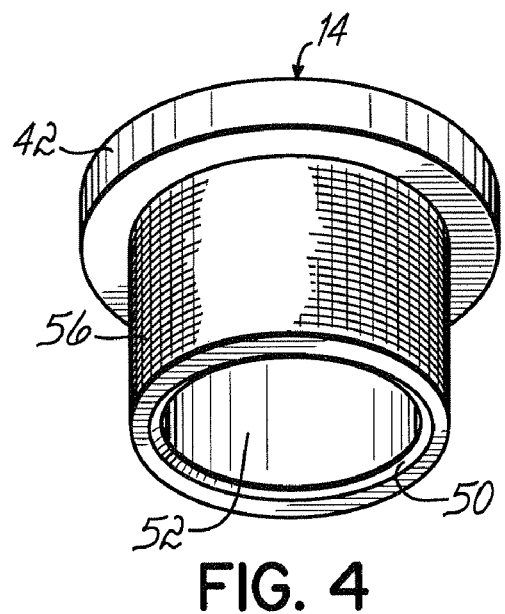
FIG. 4 is a perspective view similar to FIG. 3 of an alternative embodiment of a metallic insert for a torsional vibration damper in accordance with the principles of the invention.

Alternatively and with reference to FIG. 4 in which like reference numerals refer to like features, the torque-locking structure may consist of a knurled surface finish, generally indicated by reference numeral 56, that acts to roughen the exterior of the sleeve 38. The material forming the polymer hub 16 at least partially fills the crevices between the cross-hatched ridges defining the knurled surface finish 56, which provides the interlocking.

In use and with reference to FIGS. 1–3, the torsional vibration damper 10 is mounted by a press fit to the shaft 12 of an internal combustion engine. When the internal combustion engine is operating, shaft 12 rotates generally about axis 37. The torsional vibration damper 10 dissipates torsional vibrations in the shaft 12 and may optionally drive peripheral accessories from drive surface 22. With reference to FIG. 2, the torsional vibration damper 10 is removable from the end of the shaft 12 with the assistance of a gear puller, generally indicated by reference number 58. Arms 60 of the gear puller 58 are spread apart and a hook-shaped jaw 62 at one end of each arm 60 is inserted axially into one of the service ports 34. The arms 60 are allowed to collapse inwardly so each of the jaws 62 is positioned beneath one of the lips 44 of flange 42.

A lateral or axial force is applied by the gear puller 58, generally in the direction of arrow 64 and generally parallel to longitudinal axis 37, sufficient to overcome the press fit between the metallic insert 14 and the shaft 12 and remove the torsional vibration damper 10 from shaft 12 in direction 64. Each jaw 62 contacts one of the lips 44 for the duration over which the axial force is applied. The axial force applied by the jaw members 62 to flange 42 is transferred from flange 42 to the metallic insert 14. The symmetrical affangement of the three service ports 34 promotes a uniform distribution of the axial force transferred from the gear puller 58 to the flange 42. The preferential transfer of the applied axial force to the metallic insert 14 significantly reduces, eliminates, or otherwise limits the fraction of the lateral force from jaw members 62 applied and/or transferred to the material forming the polymer hub 16. Because the axial force is preferentially transferred by flange 42 to the metallic insert 14, the material forming the polymer hub 16 remains substantially stress free. Therefore, the polymer hub 16 is less likely to be damaged during the removal procedure and more likely to be in a reusable condition after removal.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, the combination of the polymer hub and metallic insert may be used as a general coupling structure mountable to a rotatable shaft. The invention in its broader aspects is therefore not limited to the specific details, representative apparatus and methods, and illustrative examples shown and described. Accordingly, departures may be made from such details without departing from the spirit or scope of applicant's general inventive concept. The scope of the invention itself should only be defined by the appended claims, Wherein I claim:

1. A coupling structure for a rotatable shaft, comprising:
   a polymer hub having a plurality of service ports, said polymer hub being centered about a longitudinal axis; and
   a metallic insert disposed radially inward from said polymer hub, said metallic insert including a tubular sleeve having an open first end capable of being mounted to the rotatable shaft, a second end opposite said first end, and an annular insert flange projecting radially outward from said second end, said insert flange including a plurality of lips projecting radially into a respective one of said plurality of service ports, and said plurality of lips positioned to receive a force for removing the coupling structure from the rotatable shaft when mounted thereto.

2. The coupling structure of claim 1 wherein said polymer hub includes a hub flange disposed radially outward of said tubular sleeve, and said service ports are partially inset within said hub flange to define a plurality of channels each having a centerline generally aligned with said longitudinal axis, each of said plurality of lips of said insert flange being aligned with a corresponding one of said plurality of channels.

3. The coupling structure of claim 2 wherein said channels extend along the entire axial extent of said hub flange to said insert flange.

4. The coupling structure of claim 1 wherein said tubular sleeve is dimensioned to provide a press fit with the rotatable shaft when mounted thereto.

5. The coupling structure of claim 1 wherein said insert flange includes a rim, and each of said plurality of lips comprises a seating surface extending from said rim to said tubular sleeve and aligned with a corresponding one of said service ports.

6. The coupling structure of claim 5 wherein said inclined seating surface is inclined at about 80° relative to said longitudinal axis.

7. The coupling structure of claim 1 wherein said tubular sleeve includes at least one concavity filled with a portion of a material forming said polymer hub for preventing relative rotation between said metallic insert and said polymer hub.

8. The coupling structure of claim 1 wherein said sleeve has a knurled surface finish cooperating with material from said polymer hub for preventing relative rotation between said metallic insert and said polymer hub.

9. A torsional vibration damper for a rotatable shaft, comprising:
   an annular inertia member, said inertial member being centered about a longitudinal axis;
   an elastomer layer disposed radially inward from said inertia member;
   a polymer hub disposed radially inward from said elastomer layer, said polymer hub having a plurality of service ports; and
   a metallic insert disposed radially inward from the polymer hub, said metallic insert including a tubular sleeve having an open first end capable of being mounted to the rotatable shaft, a second end opposite said first end, and an annular insert flange projecting radially outward from said second end, said insert flange including a plurality of lips each projecting radially into a respective one of said plurality of service ports, and said plurality of lips positioned to receive a force for removing the torsional vibration damper from the rotatable shaft when mounted thereto.

10. The torsional vibration damper of claim 9 wherein said polymer hub includes a hub flange disposed radially outward of said tubular sleeve, and said service ports are partially inset within said hub flange to define a plurality of channels each having a centerline generally aligned with said longitudinal axis, each of said plurality of lips of said insert flange being aligned with a corresponding one of said plurality of channels.

11. The torsional vibration damper of claim 10 wherein said channels extend along the entire axial extent of said hub flange to said insert flange.

12. The torsional vibration damper of claim 9 wherein said tubular sleeve is dimensioned to provide a press fit with the rotatable shaft when mounted thereto.

13. The torsional vibration damper of claim 9 wherein said insert flange includes a rim and each of said plurality of lips comprises a seating surface extending from said rim to said tubular sleeve and aligned with a corresponding one of said service ports.

14. The torsional vibration damper of claim 13 wherein said seating surface is inclined at about 80° relative to said longitudinal axis.

15. The torsional vibration damper of claim 9 wherein said tubular sleeve includes at least one concavity filled with a portion of a material forming said polymer hub for preventing relative rotation between said metallic insert and said polymer hub.

16. The torsional vibration damper of claim wherein said sleeve has a knurled surface finish cooperating with material from said polymer hub for preventing relative rotation between said metallic insert and said polymer hub.

* * * * *

UNITED STATES PATENT AND TRADEMARK OFFICE
CERTIFICATE OF CORRECTION

| | | |
|---|---|---|
| PATENT NO. | : 7,197,959 B2 | Page 1 of 1 |
| APPLICATION NO. | : 10/657954 | |
| DATED | : April 3, 2007 | |
| INVENTOR(S) | : Michael Crissy | |

It is certified that error appears in the above-identified patent and that said Letters Patent is hereby corrected as shown below:

Abstract (57), line 9, change "incorporates" to --incorporated--.

Column 1:
Line 23, change "include" to --includes--.
Line 29, change "incorporates" to --incorporate--.
Line 40, change "reduces" to --reduce--.

Column 2, line 12, after "between" delete "a".

Column 3, line 52, change "is" to --are--.

Column 5:
Line 45-46, change "affangement" to --arrangement--.
Line 47, change "transfened" to --transferred--.
Line 51, change "transfened" to --transferred--.
Line 53, change "transfened" to --transferred--.

Claim 16, column 8, line 14, after "claim" insert --9--.

Signed and Sealed this

Twenty-first Day of August, 2007

JON W. DUDAS
*Director of the United States Patent and Trademark Office*